(12) United States Patent
Nishihara et al.

(10) Patent No.: US 12,276,005 B2
(45) Date of Patent: Apr. 15, 2025

(54) STEEL SHAFT COMPONENT

(71) Applicant: NIPPON STEEL CORPORATION, Tokyo (JP)

(72) Inventors: Kison Nishihara, Tokyo (JP); Hiroaki Tahira, Tokyo (JP); Yoko Sueyasu, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 712 days.

(21) Appl. No.: 17/593,593

(22) PCT Filed: Apr. 9, 2020

(86) PCT No.: PCT/JP2020/015917
§ 371 (c)(1),
(2) Date: Sep. 21, 2021

(87) PCT Pub. No.: WO2020/209320
PCT Pub. Date: Oct. 15, 2020

(65) Prior Publication Data
US 2022/0177991 A1 Jun. 9, 2022

(30) Foreign Application Priority Data
Apr. 10, 2019 (JP) .................................. 2019-074788

(51) Int. Cl.
*C21D 9/30* (2006.01)
*C22C 38/00* (2006.01)
(Continued)

(52) U.S. Cl.
CPC .............. *C21D 9/30* (2013.01); *C22C 38/001* (2013.01); *C22C 38/002* (2013.01); *C22C 38/02* (2013.01);
(Continued)

(58) Field of Classification Search
CPC ................ C21D 9/30; C21D 2211/005; C21D 2211/009; C22C 38/001; C22C 38/002;
(Continued)

(56) References Cited

U.S. PATENT DOCUMENTS

| 2011/0274578 A1 | 11/2011 | Mizuno et al. |
| 2013/0180626 A1 | 7/2013 | Yoshida |
| 2014/0251507 A1* | 9/2014 | Mizuno ..................... C23C 8/50 148/318 |

FOREIGN PATENT DOCUMENTS

| JP | 10137888 A | 5/1998 |
| JP | 2004137537 A | 5/2004 |

(Continued)

OTHER PUBLICATIONS

Machine Translation of WO-2018180342-A1 (Year: 2018).*
Machine Translation of JP-2008280583-A (Year: 2008).*

*Primary Examiner* — John A Hevey
(74) *Attorney, Agent, or Firm* — Greer, Burns & Crain, Ltd.

(57) ABSTRACT

The steel shaft component consists of C: 0.40 to 0.60%, Si: 0.05 to 1.00%, Mn: 1.00 to 2.00%, P: 0.030% or less, S: 0.005 to 0.100%, Cr: 0.10 to 0.50%, V: 0.10 to 0.30%, Al: 0.005 to 0.050%, N: 0.0050 to 0.0200%, Ti: 0 to 0.050%, and the balance: Fe and impurities. A Vickers hardness Hs of the surface of the shaft part is 620 HV or more. A Vickers hardness Hb at an R/2 position satisfies Formula (1). A depth of the hardened layer Hr (mm) having a Vickers hardness of 620 HV or more satisfies Formula (2). The microstructure at the R/2 position is composed of ferrite and pearlite. Within the hardened layer, the number of density of V-containing precipitates having an equivalent circular diameter of more than 100 nm is 10 particles/276 µm² or less.

$Hs/2.3 \leq Hb \leq 350$ (1)

$0.05 \leq Hr/R \leq 0.40$ (2)

4 Claims, 2 Drawing Sheets

(51) Int. Cl.
*C22C 38/02* (2006.01)
*C22C 38/04* (2006.01)
*C22C 38/06* (2006.01)
*C22C 38/24* (2006.01)
*C22C 38/28* (2006.01)

(52) U.S. Cl.
CPC .............. *C22C 38/04* (2013.01); *C22C 38/06* (2013.01); *C22C 38/24* (2013.01); *C22C 38/28* (2013.01); *C21D 2211/005* (2013.01); *C21D 2211/009* (2013.01)

(58) Field of Classification Search
CPC ......... C22C 38/02; C22C 38/04; C22C 38/06; C22C 38/24; C22C 38/28
See application file for complete search history.

(56) References Cited

FOREIGN PATENT DOCUMENTS

| | | | |
|---|---|---|---|
| JP | 2008280583 A | * | 11/2008 |
| JP | 2010270346 A | | 12/2010 |
| JP | 2011208250 A | | 10/2011 |
| JP | 2013007098 A | | 1/2013 |
| JP | 2014025104 A | | 2/2014 |
| JP | 2015174088 A1 | | 4/2017 |
| KR | 1020110095955 A | | 8/2011 |
| KR | 1020120087184 A | | 8/2012 |
| WO | WO-2018180342 A1 | * | 10/2018 ............. C22C 38/00 |

* cited by examiner

STEEL SHAFT COMPONENT

TECHNICAL FIELD

The present invention relates to a steel shaft component, and more particularly relates to a steel shaft component equipped with one or a plurality of shaft parts, as typified by a crankshaft and a camshaft.

BACKGROUND ART

A steel shaft component typified by a crankshaft is equipped with one or a plurality of shaft parts. In a case where the steel shaft component is a crankshaft, a crank pin and a crank journal correspond to shaft parts. Such kind of steel shaft components are utilized as machine components of industrial machinery, construction machinery, and machinery for transportation as typified by an automobile.

A steel shaft component is produced by the following process. A steel material that is the starting material for the steel shaft component is hot-forged to produce an intermediate product. As necessary, the produced intermediate product is subjected to a thermal refining treatment. The non-heat treated intermediate product in the state after hot forging or the intermediate product after thermal refining treatment is subjected to machining into a component shape by cutting or piercing or the like. A surface hardening heat treatment such as high frequency quenching is performed on the machined intermediate product. After the surface hardening heat treatment, the intermediate product is finished by grinding to produce a steel shaft component.

A steel shaft component to be utilized for the aforementioned uses is required to have excellent fatigue strength. Techniques for increasing the fatigue strength of a machine component that is subjected to high frequency quenching after hot forging are proposed, for example, in Japanese Patent Application Publication No. 2013-7098 (Patent Literature 1), Japanese Patent Application Publication No. 2010-270346 (Patent Literature 2), and Japanese Patent Application Publication No. 2004-137237 (Patent Literature 3).

In Patent Literature 1, a steel material for use in a machine component that is subjected to high frequency quenching after hot forging is proposed. A steel for hot forging disclosed in Patent Literature 1 consists of, by mass %, C: more than 0.30 to less than 0.60%, Si: 0.10 to 0.90%, Mn: 0.50 to 2.0%, P: 0.080% or less, S: 0.010 to 0.10%, Al: more than 0.005 to 0.10%, Cr: 0.01 to 1.0%, Ti: 0.001 to less than 0.040%, Ca: 0.0003 to 0.0040%, Te: 0.0003 to less than 0.0040%, N: 0.0030 to 0.020%, and O: 0.0050% or less, with the balance being Fe and impurities, and satisfies the expression Ca/Te>1.00, and in which the equivalent circular diameter of sulfide inclusions is 20 μm or less.

In Patent Literature 2, a steel material for use in a machine component that is subjected to high frequency quenching after hot forging and which is a steel material that is excellent in bending fatigue strength is proposed. A non-heat treated steel for hot forging disclosed in Patent Literature 2 has a chemical composition consisting of, by mass %, C: 0.25 to 0.50%, Si: 0.05 to 1.00%, Mn: 0.60 to 1.80%, P≤0.030%, S≤0.060%, Cr: 0.50% or less, Mo: 0.03% or less, V: 0.050 to 0.250%, Ti: 0.005 to 0.020%, Al: 0.050% or less, and N: 0.008 to 0.015%, and that satisfies Formula (1), with the balance being Fe and unavoidable impurities, and in which, in the microstructure of the raw steel material after hot forging, a ferrite volume fraction (F %), an average ferrite grain size (μm), and a content (%) of V in the steel satisfy Formula (2). Here, Formula (1) is 3.10≤2.7×Mn+4.6×Cr+V≤5.60, and Formula (2) is 0.04≤ferrite volume fraction (F %)×V/average ferrite grain size (μm)≤0.18.

In Patent Literature 3, a steel material for use in a machine component that is subjected to high frequency quenching after hot forging and which is a steel material excellent in fatigue strength is proposed. A high strength and high workability steel for high frequency quenching disclosed in Patent Literature 3 consists of, by mass %, C: 0.5 to 0.7%, Si: 0.5 to 1.0%, Mn: 0.5 to 1.0%, Cr: 0.4% or less, S: 0.035% or less, V: 0.01 to 0.15%, Al: more than 0.015 to less than 0.050%, and N: more than 0.010 to less than 0.025%, with the balance being Fe and unavoidable impurities, and the steel material is used by performing high frequency quenching of a part of the component after forging.

CITATION LIST

Patent Literature

Patent Literature 1: Japanese Patent Application Publication No. 2013-7098
Patent Literature 2: Japanese Patent Application Publication No. 2010-270346
Patent Literature 3: Japanese Patent Application Publication No. 2004-137237

SUMMARY OF INVENTION

Technical Problem

Conventionally, as in the aforementioned Patent Literatures 1 to 3, it has been attempted to improve the fatigue strength of a steel shaft component that is an end product after hot forging and high frequency quenching, by adjusting the chemical composition and microstructure of the steel material that serves as the starting material of the steel shaft component. However, even when the aforementioned steel material is used, in some cases high fatigue strength is not sufficiently obtained in the steel shaft component that is the end product.

An objective of the present disclosure is to provide a steel shaft component that has excellent fatigue strength.

Solution to Problem

A steel shaft component according to the present disclosure includes:

one or a plurality of shaft parts, each of the shaft part having a circular shape in a cross section perpendicular to an axial direction, and having a hardened layer having a Vickers hardness of 620 HV or more in an outer layer;

wherein:

a chemical composition of the steel shaft component consists of, by mass %,
C: 0.40 to 0.60%,
Si: 0.05 to 1.00%,
Mn: 1.00 to 2.00%,
P: 0.030% or less,
S: 0.005 to 0.100%,
Cr: 0.10 to 0.50%,
V: 0.10 to 0.30%,
Al: 0.005 to 0.050%,
N: 0.0050 to 0.0200%,
Ti: 0 to 0.050%, and
the balance: Fe and impurities;

a Vickers hardness Hs of a surface of the shaft part is 620 HV or more;

in the cross section perpendicular to the axial direction of the shaft part, a Vickers hardness Hb at an R/2 position that corresponds to a center position of a radius R of the shaft part satisfies Formula (1);

a microstructure at the R/2 position is composed of ferrite and pearlite;

a depth Hr (mm) of the hardened layer having a Vickers hardness of 620 HV or more satisfies Formula (2); and in the hardened layer of the cross section perpendicular to the axial direction of the shaft part, a number of density of V-containing precipitates which contain V and which have an equivalent circular diameter of more than 100 nm is 10 particles/276 µm² or less:

$$Hs/2.3 \leq Hb \leq 350 \tag{1}$$

$$0.05 \leq Hr/R \leq 0.40 \tag{2}$$

where, R in Formula (2) represents a radius (mm) of the shaft part.

Advantageous Effect of Invention

The steel shaft component of the present disclosure has excellent fatigue strength.

DESCRIPTION OF EMBODIMENTS

The present inventors carried out studies and investigations regarding the fatigue strength, more specifically, the rotating bending fatigue strength, of steel shaft components. Conventionally, as described in Patent Literatures 1 to 3, with respect to a steel shaft component that is subjected to hot forging and high frequency quenching, it has been attempted to improve the fatigue strength of the steel shaft component by adjusting the chemical composition and microstructure of the steel material which serves as the starting material of the steel shaft component. However, there have been cases in which high fatigue strength cannot be sufficiently obtained in the steel shaft component that is the end product. Therefore, the present inventors focused their attention on the steel shaft component that is the end product, and conducted studies regarding the fatigue strength of the steel shaft component.

As mentioned above, in the case of forming a hardened layer in an outer layer of a steel shaft component by high frequency quenching, it has been considered that the higher the hardness of the hardened layer is, the higher the fatigue strength of the steel shaft component will be. The reason is as follows. Conventionally, it has been thought that a decrease in the fatigue strength is caused by cracks that occur at the surface of the steel shaft component. Therefore, conventionally, it has been considered that by making the hardness of the hardened layer as high as possible, the occurrence of cracks at the surface can be suppressed and the fatigue strength can be increased.

However, as a result of studies conducted by the present inventors, it has been revealed that when the hardness of a hardened layer is increased, there are cases in which cracks occur not at the surface of the steel shaft component, but rather occur within the steel shaft component, more specifically, cracks occur at a core part (base material portion) in the vicinity of the hardened layer of the steel shaft component, and the fatigue strength decreases.

Therefore, the present inventors investigated the relation between the strength distribution in the radial direction of a steel shaft component and the distribution of stress that is applied to respective positions in the radial direction of the steel shaft component during use of the steel shaft component. In the case of a steel shaft component, when a load is applied in a direction (radial direction of the steel shaft component) perpendicular to the longitudinal direction (axial direction) of the steel shaft component, bending fatigue is applied to the steel shaft component. Therefore, the present inventors investigated the distribution of stress applied in the radial direction in a stress concentration region of the steel shaft component when a load is applied in the radial direction of the steel shaft component.

Figure 1:
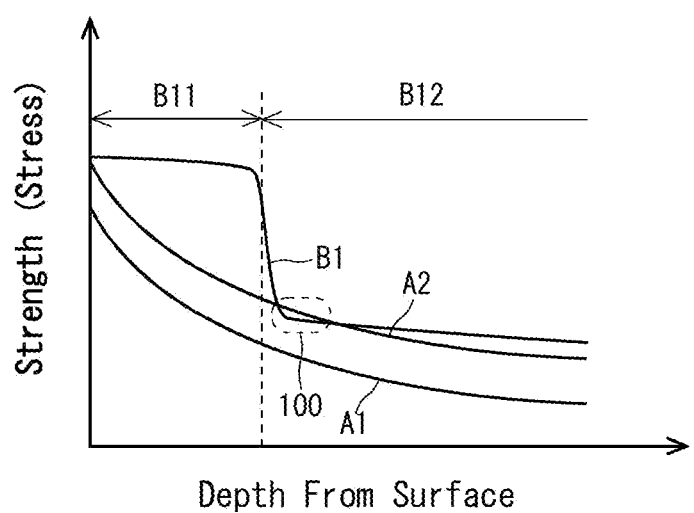
FIG. 1 is an illustrative diagram that illustrates the relation between the strength distribution in a depth direction (radial direction) from a surface of a steel shaft component, and the distribution of stress applied to the steel shaft component during use.

FIG. 1 is an illustrative diagram that illustrates the relation between the strength distribution in the depth direction (radial direction) from the surface of a steel shaft component and the distribution of stress that is applied to the steel shaft component during use. Solid lines A1 and A2 in FIG. 1 represent the distribution of stress that is applied during use. A solid line B1 in FIG. 1 represents the strength distribution in the radial direction of the steel shaft component.

Referring to FIG. 1, the distribution of stress (A1 and A2) applied to the steel shaft component during use is highest at the surface, and decreases continuously as the distance from the surface increases in the depth direction (radial direction). On the other hand, the distribution of strength (B1) in the radial direction of the steel shaft component is high in a hardened layer region B11, and becomes lower in a core part region B12 which is located further inward than the hardened layer, and furthermore, the strength rapidly decreases in a discontinuous manner upon progressing to the core part region B12 from the hardened layer region B11. This is due to the fact that while the hardened layer region has a martensitic structure, the core part region has a ferrite and pearlite structure.

As mentioned above, although the distribution of stress that is applied to the steel shaft component during use is continuous, the hardness distribution of the steel shaft component is discontinuous. Consequently, it is considered that, in a case where the distribution of stress applied to the steel shaft component during use increases from A1 to A2, as illustrated in a region 100 in FIG. 1, in the core part region B12 in the vicinity of the hardened layer region B11, the stress distribution A2 is more than the strength of the core part region B12, and cracks occur within the steel shaft component.

In consideration of the above phenomenon, the present inventors thought that the fatigue strength can be further improved by increasing the hardness of the hardened layer while also reducing a difference between the hardness of the hardened layer and the hardness of the core part. Therefore, the present inventors conducted further studies regarding the relation between the hardness of the hardened layer and the hardness of the core part. As a result, the present inventors found that there is a possibility that excellent fatigue strength will be obtained in a steel shaft component if the chemical composition of the steel shaft component is a chemical composition consisting of, by mass %, C: 0.40 to 0.60%, Si: 0.05 to 1.00%, Mn: 1.00 to 2.00%, P: 0.030% or less, S: 0.005 to 0.100%, Cr: 0.10 to 0.50%, V: 0.10 to 0.30%, Al: 0.005 to 0.050%, N: 0.0050 to 0.0200%, Ti: 0 to 0.050%, and the balance: Fe and impurities, and adjustment is performed so that a Vickers hardness Hs of the surface (that is, a hardened layer) of the shaft part is 620 HV or more, and furthermore, when it is assumed that a Vickers hardness Hb at a center position of a radius R (hereinafter, referred to as an "R/2 position") of the shaft part of the steel shaft component corresponds to the core part hardness, the Vickers hardness Hb at the R/2 position satisfies Formula (1).

$$Hs/2.3 \leq Hb \leq 350 \quad (1)$$

When Formula (1) is satisfied, in the steel shaft component having the aforementioned chemical composition, the difference between the hardness of the hardened layer and the hardness of the core part becomes sufficiently small. Therefore, a decrease in fatigue strength that is attributable to internal cracking can be suppressed.

The present inventors also conducted studies regarding the relation between the depth of the hardened layer and the fatigue strength. As a result it has been revealed that if the hardened layer is too deep, the fatigue strength in fact decreases. It is considered that the reason is as follows. When the hardened layer has an appropriate depth, compressive residual stress is applied in the axial direction at the outer layer of the steel shaft component. In this case, it is considered that the occurrence of cracks at the surface of the steel shaft component is suppressed by the compressive residual stress. On the other hand, in a case where the hardened layer is too deep, at the outer layer of the steel shaft component, the compressive residual stress becomes low or tensile residual stress is applied. It is considered that, as a result, cracks easily occur at the surface of the steel shaft component, and the fatigue strength decreases.

Therefore, the present inventors conducted investigations with respect to an appropriate range of a ratio (Hr/R) between a depth of the hardened layer Hr at which the hardness is 620 HV or more in Vickers hardness, and the radius R of the shaft part of the steel shaft component. As a result it has been found that in a steel shaft component that has the aforementioned chemical composition and that satisfies Formula (1), if Formula (2) is also satisfied, excellent fatigue strength is obtained:

$$0.05 \leq Hr/R \leq 0.40 \quad (2)$$

where, R in Formula (2) represents the radius (mm) of the shaft part.

However, even in steel shaft components that had the aforementioned chemical composition and that satisfied Formula (1) and Formula (2), there were some cases in which the fatigue strength was low. Therefore, the present inventors conducted further studies to investigate the cause of the decrease in the fatigue strength. As a result, the present inventors obtained the following findings. In the case of a steel shaft component having the aforementioned chemical composition, a large number of precipitates containing V (hereinafter, also referred to as "V-containing precipitates") are present in the hardened layer. Here, the term "V-containing precipitates" means precipitates in which the content of V is 10% or more by mass %. Examples of V-containing precipitates include V carbides, V nitrides, and V carbo-nitrides. The V-containing precipitates increase the hardness of the hardened layer by precipitation strengthening. However, when a large number of V-containing precipitates having an equivalent circular diameter of more than 100 nm (hereinafter, also referred to as "coarse V-containing precipitates") are present in the hardened layer, cracks for which the coarse V-containing precipitates act as starting points are liable to occur due to a load applied in the radial direction of the steel shaft component. Therefore, the fatigue strength decreases. If a steel shaft component which has the aforementioned chemical composition satisfies Formula (1) and Formula (2), and in addition, is a component in which the number of density of coarse V-containing precipitates in the hardened layer is 10 particles/276 $\mu m^2$ or less, excellent fatigue strength will be obtained.

A steel shaft component according to the present embodiment that has been completed based on the above findings has the following structure.

[1]

A steel shaft component, including:
one or a plurality of shaft parts, each of the shaft part having a circular shape in a cross section perpendicular to an axial direction, and having a hardened layer having a Vickers hardness of 620 HV or more in an outer layer;
wherein:
a chemical composition of the steel shaft component consists of, by mass %,
C: 0.40 to 0.60%,
Si: 0.05 to 1.00%,
Mn: 1.00 to 2.00%,
P: 0.030% or less,
S: 0.005 to 0.100%,
Cr: 0.10 to 0.50%,
V: 0.10 to 0.30%,
Al: 0.005 to 0.050%,
N: 0.0050 to 0.0200%,
Ti: 0 to 0.050%, and
the balance: Fe and impurities;
a Vickers hardness Hs of a surface of the shaft part is 620 HV or more;
in the cross section perpendicular to the axial direction of the shaft part, a Vickers hardness Hb at an R/2 position that corresponds to a center position of a radius R of the shaft part satisfies Formula (1);
a microstructure at the R/2 position is composed of ferrite and pearlite;
a depth Hr (mm) of the hardened layer having a Vickers hardness of 620 HV or more satisfies Formula (2); and
in the hardened layer of the cross section perpendicular to the axial direction of the shaft part, a number of density of V-containing precipitates which contain V and which have an equivalent circular diameter of more than 100 nm is 10 particles/276 $\mu m^2$ or less:

$$Hs/2.3 \leq Hb \leq 350 \quad (1)$$

$$0.05 \leq Hr/R \leq 0.40 \quad (2)$$

where, R in Formula (2) represents a radius (mm) of the shaft part.

[2]

The steel shaft component according to [1], wherein:
the chemical composition contains, by mass %,
Ti: 0.005 to 0.050%.

[3]

The steel shaft component according to [1] or [2], wherein:

the steel shaft component is a crankshaft or a camshaft.

Hereunder, the steel shaft component according to the present embodiment is described in detail.

[Structure of Steel Shaft Component]

The steel shaft component according to the present embodiment includes one or a plurality of shaft parts. In each shaft part a cross section perpendicular to the longitudinal direction (axial direction) of the steel shaft component is a circular shape, and the shaft part has a hardened layer in an outer layer. In the present description, the term "hardened layer" means a region in which the Vickers hardness is 620 HV or more. As described later, the hardened layer is formed in an outer layer of the steel shaft component by performing high frequency quenching.

Figure 2:
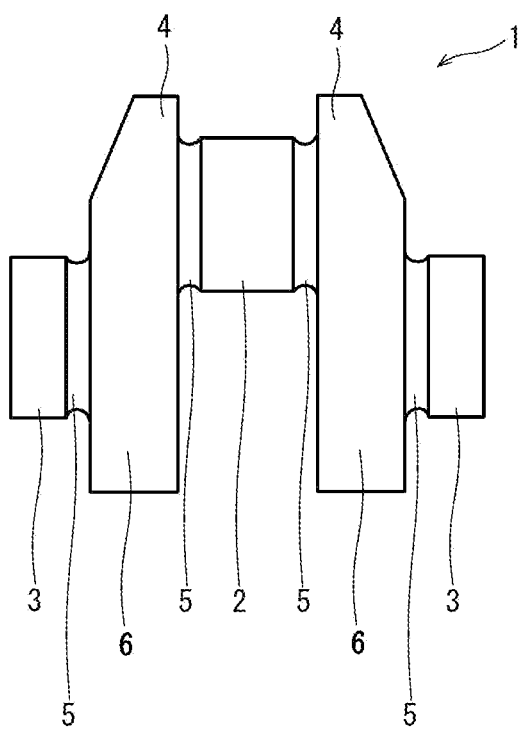
FIG. 2 is a view illustrating principal parts of a crankshaft that is one example of the steel shaft component according to the present embodiment.

FIG. 2 is a view illustrating principal parts of a crankshaft 1 that is one example of the steel shaft component according to the present embodiment. The crankshaft 1 is equipped with a crank pin 2 and crank journals 3 that correspond to shaft parts. The crankshaft 1 illustrated in FIG. 2 is also equipped with crank arms 4 and counterweights 6. Each crank arm 4 is disposed between the crank pin 2 and one of the crank journals 3, and is connected to the crank pin 2 and the corresponding crank journal 3. Each counterweight 6 is connected to the corresponding crank arm 4. The crank pin 2 includes fillet parts 5 at connecting portions with the crank arms 4. Similarly, each crank journal 3 includes a fillet part 5 at a connecting portion with the corresponding crank arm 4. Note that, the fillet parts 5 need not be provided.

In FIG. 2, a configuration of a crankshaft as one example of the steel shaft component is illustrated. However, the steel shaft component is not limited to a crankshaft. The steel shaft component may be, for example, a camshaft. The steel shaft component may include one shaft part, or as in the configuration of the crankshaft 1 that is illustrated in FIG. 2, may include a plurality of shaft parts (the crank pin 2 and the crank journals 3).

Figure 3:
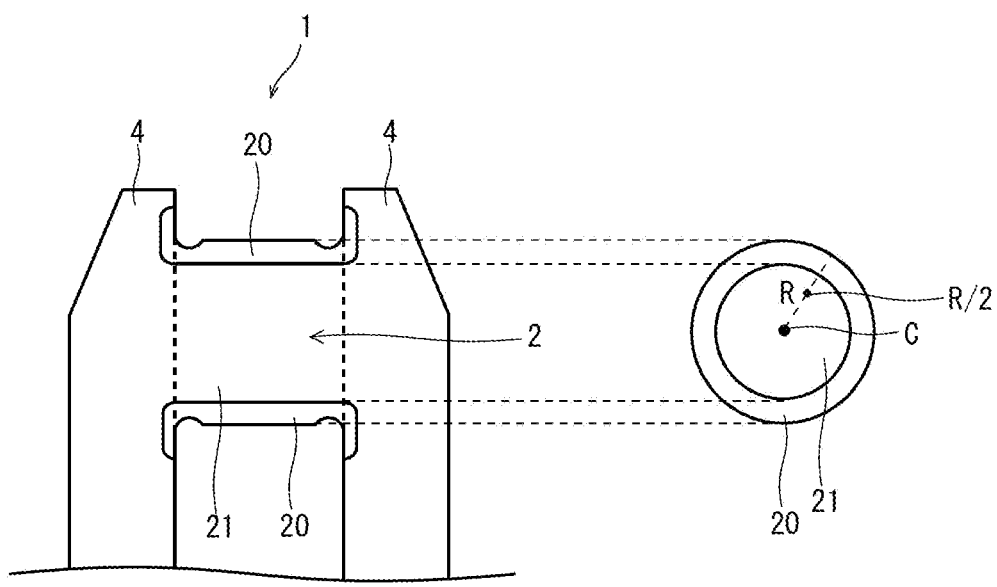
FIG. 3 is a cross-sectional view of a crank pin that corresponds to a shaft part in FIG. 2.

FIG. 3 is a cross-sectional view at a plane including the central axis of the crank pin 2 illustrated in FIG. 2. Referring to FIG. 3, a hardened layer 20 is formed in the outer layer of the crank pin 2 that corresponds to a shaft part. As mentioned above, the Vickers hardness of the hardened layer 20 is 620 HV or more. That is, in the hardened layer 20, the lowest value of the Vickers hardness is 620 HV. In the present description, in the crank pin 2 that corresponds to a shaft part, a portion which is further inward than the hardened layer 20 (that is, a portion of the crank pin 2 at which the Vickers hardness is less than 620 HV) is referred to as "core part 21".

[Chemical Composition]

The chemical composition of the steel shaft component of the present embodiment contains the following elements. Note that, in the present description, the symbol "%" in relation to an element means "mass %" unless specifically stated otherwise.

C: 0.40 to 0.60%

Carbon (C) increases the hardness of the core part and the hardened layer of the shaft part of the steel shaft component, and increases the fatigue strength of the steel shaft component. If the content of C is less than 0.40%, even when the contents of the other elements are within the ranges of the present embodiment, the aforementioned effects will not be sufficiently obtained. On the other hand, if the content of C is more than 0.60%, even when the contents of the other elements are within the ranges of the present embodiment, the hardness of the steel shaft component will excessively increase, and in some cases the fatigue strength of the steel shaft component will, on the contrary, decrease. In addition, the machinability of the steel material that is the starting material of the steel shaft component will decrease. Therefore, the content of C is within the range of 0.40 to 0.60%. A preferable lower limit of the content of C is 0.43%, more preferably is 0.44%, further preferably is 0.45%, and further preferably is 0.46%. A preferable upper limit of the content of C is 0.59%, more preferably is 0.56%, further preferably is 0.54%, more preferably is 0.52%, and further preferably is 0.50%.

Si: 0.05 to 1.00%

Silicon (Si) dissolves in ferrite to thereby strengthen the ferrite. Therefore, the hardness of the core part of the steel shaft component increases. If the content of Si is less than 0.05%, even when the contents of the other elements are within the ranges of the present embodiment, the aforementioned effect will not be sufficiently obtained. On the other hand, if the content of Si is more than 1.00%, even when the contents of the other elements are within the ranges of the present embodiment, the steel material will undergo decarburization during hot forging. In this case, in the steel material (intermediate product) after hot forging, the cutting allowance will increase. Therefore, the content of Si is within the range of 0.05 to 1.00%. A preferable lower limit of the content of Si is 0.10%, more preferably is 0.20%, further preferably is 0.30%, and further preferably is 0.35%. A preferable upper limit of the content of Si is 0.90%, more preferably is 0.80%, further preferably is 0.75%, and further preferably is 0.70%.

Mn: 1.00 to 2.00%

Manganese (Mn) increases the hardness of the steel shaft component. If the content of Mn is less than 1.00%, even when the contents of the other elements are within the ranges of the present embodiment, the aforementioned effect will not be sufficiently obtained. On the other hand, if the content of Mn is more than 2.00%, even when the contents of the other elements are within the ranges of the present embodiment, bainite will easily form in the microstructure. In such case, the machinability of the steel material will decrease. Therefore, the content of Mn is within the range of 1.00 to 2.00%. A preferable lower limit of the content of Mn is 1.05%, more preferably is 1.10%, further preferably is 1.12%, and further preferably is 1.15%. A preferable upper limit of the content of Mn is 1.90%, more preferably is 1.80%, further preferably is 1.70%, and further preferably is 1.60%.

P: 0.030% or Less

Phosphorus (P) is an impurity that is unavoidably contained. That is, the content of P is more than 0%. P segregates at grain boundaries and thereby reduces the fatigue strength of the steel shaft component. Therefore, the content of P is 0.030% or less. A preferable upper limit of the content of P is 0.025%, more preferably is 0.020%, and further preferably is 0.018%. The content of P is preferably as low as possible. However, extremely reducing the content of P will significantly increase the production cost. Therefore, when taking industrial production into consideration, a preferable lower limit of the content of P is 0.001%, more preferably is 0.002%, and further preferably is 0.003%.

S: 0.005 to 0.100%

Sulfur (S) forms sulfide such as MnS, and thereby increases the machinability of the steel material. If the content of S is less than 0.005%, even when the contents of the other elements are within the ranges of the present embodiment, the aforementioned effect will not be sufficiently obtained. On the other hand, if the content of S is more than 0.100%, even when the contents of the other elements are within the ranges of the present embodiment, the hot workability of the steel material decreases. Therefore, the content of S is within the range of 0.005 to 0.100%. A preferable lower limit of the content of S is 0.008%, more preferably is 0.010%, further preferably is 0.012%, and further preferably is 0.014%. A preferable upper limit of the content of S is 0.090%, more preferably is 0.080%, further preferably is 0.075%, and further preferably is 0.070%.

Cr: 0.10 to 0.50%

Chromium (Cr) increases the hardness of the steel shaft component. If the content of Cr is less than 0.10%, even when the contents of the other elements are within the ranges of the present embodiment, the aforementioned effect will not be sufficiently obtained. On the other hand, if the content of Cr is more than 0.50%, even when the contents of the other elements are within the ranges of the present embodiment, bainite will form in the microstructure, and the machinability of the steel material will decrease. Therefore, the content of Cr is within the range of 0.10 to 0.50%. A preferable lower limit of the content of Cr is 0.11%, more preferably is 0.12%, and further preferably is 0.13%. A preferable upper limit of the content of Cr is 0.40%, more preferably is 0.35%, further preferably is 0.30%, further preferably is 0.29%, further preferably is 0.28%, further preferably is 0.25%, and further preferably is 0.20%.

V: 0.10 to 0.30%

Vanadium (V) forms fine carbides and increases the hardness of the core part of the steel shaft component. As a result, the fatigue strength of the steel shaft component increases. If the content of V is less than 0.10%, even when the contents of the other elements are within the ranges of the present embodiment, the aforementioned effect will not be sufficiently obtained. On the other hand, if the content of V is more than 0.30%, even when the contents of the other elements are within the ranges of the present embodiment, coarse V carbo-nitrides will form and the fatigue strength of the steel shaft component will decrease. Therefore, the content of V is within the range of 0.10 to 0.30%. A preferable lower limit of the content of V is 0.11%, more preferably is 0.12%, and further preferably is 0.13%. A preferable upper limit of the content of V is 0.25%, more preferably is 0.20%, further preferably is 0.18%, and further preferably is 0.15%.

Al: 0.005 to 0.050%

Aluminum (Al) deoxidizes the steel. In addition, Al forms nitrides and suppresses coarsening of grains. Therefore, a marked decrease in the hardness and toughness of the steel shaft component is suppressed. If the content of Al is less than 0.005%, even when the contents of the other elements are within the ranges of the present embodiment, the aforementioned effects will not be sufficiently obtained. On the other hand, if the content of Al is too high, even when the contents of the other elements are within the ranges of the present embodiment, $Al_2O_3$-based inclusions will be excessively formed. $Al_2O_3$-based inclusions cause the machinability of the steel material to decrease. Therefore, the content of Al is within the range of 0.005 to 0.050%. A preferable lower limit of the content of Al is 0.007%, more preferably is 0.010%, and further preferably is 0.012%. A preferable upper limit of the content of Al is 0.045%, more preferably is 0.042%, further preferably is 0.040%, and further preferably is 0.039%. As used herein, the term "content of Al" means the content (mass %) of acid-soluble Al (sol. Al).

N: 0.0050 to 0.0200%

Nitrogen (N) forms nitrides and carbo-nitrides. Nitrides and carbo-nitrides suppress coarsening of the grains. In this way, N suppresses a decrease in the hardness of the steel material, and the fatigue strength of the steel shaft component increases. If the content of N is less than 0.0050%, even when the contents of the other elements are within the ranges of the present embodiment, the aforementioned effect will not be sufficiently obtained. On the other hand, if the content of N is more than 0.0200%, even when the contents of the other elements are within the ranges of the present embodiment, defects such as voids are liable to occur in the steel material. Therefore, the content of N is within the range of 0.0050 to 0.0200%. A preferable lower limit of the content of N is 0.0060%, more preferably is 0.0070%, and further preferably is 0.0080%. A preferable upper limit of the content of N is 0.0180%, more preferably is 0.0170%, further preferably is 0.0160%, and further preferably is 0.0150%.

The balance of the chemical composition of the steel shaft component of the present embodiment is Fe and impurities. As used herein, the term "impurities" refers to elements which are mixed in from ore or scrap that is utilized as a raw steel material of the steel material constituting the steel shaft component or from the environment of the production process or the like.

The chemical composition of the steel shaft component of the present embodiment may also contain Ti in lieu of a part of Fe.

Ti: 0 to 0.050%

Titanium is an optional element, and need not be contained. That is, the content of Ti may be 0%. When contained, that is, when the content of Ti is more than 0%, Ti forms carbides or the like and suppresses coarsening of the grains during hot forging. If even a small amount of Ti is contained, the aforementioned effect will be obtained to a certain extent. However, if the content of Ti is more than 0.050%, even when the contents of the other elements are within the ranges of the present embodiment, coarse Ti nitrides will form and the fatigue strength of the steel shaft component will decrease. Therefore, the content of Ti is within the range of 0 to 0.050%. A preferable lower limit of the content of Ti is 0.001%, more preferably is 0.003%, further preferably is 0.005%, further preferably is 0.008%, further preferably is 0.010%, and further preferably is 0.011%. A preferable upper limit of the content of Ti is 0.040%, more preferably is 0.035%, further preferably is 0.030%, and further preferably is 0.025%.

[Microstructure of Steel Shaft Component]

In the steel shaft component, the microstructure of the core part is composed of ferrite and pearlite. In the present embodiment, an R/2 position of the shaft part corresponds to the core part. Here, as illustrated in FIG. 3, the term "R/2 position" means the center position of the radius R in a cross section (transverse section) perpendicular to the axial direction of the shaft part, and which is the center position of a line segment linking the surface and a center C in the transverse section of the shaft part. In the present embodiment, the microstructure of the core part of the steel shaft component is defined by the microstructure at the R/2 position of the shaft part. The microstructure at the R/2 position of the shaft part of the present embodiment is composed of ferrite and pearlite.

More specifically, the microstructure (matrix excluding precipitates and inclusions) at the R/2 position of the shaft part is composed of ferrite and pearlite, and other phases (bainite or martensite) are substantially not present. Note that, the term "ferrite" in the phrase "ferrite and pearlite" means pro-eutectoid ferrite. In the present description, the phrase "microstructure is composed of ferrite and pearlite"

means that in the microstructure at the R/2 position of the shaft part, the total area fraction of ferrite and pearlite is 95.0% or more.

The microstructure of the steel shaft component is observed by the following method. A sample for microstructure observation is taken from the R/2 position of the shaft part (see FIG. 3) of the steel shaft component. The size of the sample is not particularly limited, and it suffices that a visual field size to be described later can be secured within the observation surface. Among the surfaces of obtained sample, a surface that corresponds to a cross section perpendicular to the axial direction of the shaft part is adopted as the observation surface. The observation surface is mirror-polished, and thereafter the observation surface is subjected to etching using 3% nitric acid-alcohol (nital etching reagent). An arbitrary five visual fields within the etched observation surface are observed with an optical microscope having a magnification of ×500, and photographic images are generated. The size of each visual field is set to 200 μm×200 μm. In each visual field, the contrast differs for the respective phases of ferrite, pearlite, bainite and the like. Accordingly, each phase is identified based on the contrast. Ferrite and pearlite are identified in each of the visual fields. The total area (μm$^2$) of ferrite in all of the visual fields is determined, and the total area (μm$^2$) of pearlite in all of the visual fields is determined. The total area fraction (%) of ferrite and pearlite is determined based on the total of the total area of ferrite in all of the visual fields and the total area of pearlite in all of the visual fields, and the total area of all of the visual fields. If the total area fraction of ferrite and pearlite is 95.0% or more, it is determined that the microstructure is composed of ferrite and pearlite.

[Regarding Condition a to Condition D of Shaft Part]

The steel shaft component of the present embodiment also satisfies condition A to condition D with respect to the shaft part.

Condition A: A Vickers hardness Hs of the surface of the shaft part is 620 HV or more.

Condition B: In a cross section perpendicular to the axial direction of the shaft part, a Vickers hardness Hb at an R/2 position that corresponds to a center position of a radius R of the shaft part satisfies Formula (1).

$$Hs/2.3 \leq Hb \leq 350 \tag{1}$$

Condition C: A depth Hr of a hardened layer having a Vickers hardness of 620 HV or more satisfies Formula (2).

$$0.05 \leq Hr/R \leq 0.40 \tag{2}$$

Condition D: In the hardened layer of the cross section perpendicular to the axial direction of the shaft part, a number of density of coarse V-containing precipitates is 10 particles/276 μm$^2$ or less. Here, the term "coarse V-containing precipitates" means precipitates in which the content of V is, by mass %, 10% or more, and which have an equivalent circular diameter of more than 100 nm.

Condition A to condition D are described hereunder.

[Regarding Condition A]

The Vickers hardness Hs of the surface (that is, the surface of a hardened layer) of the shaft part of the steel shaft component is 620 HV or more. Here, the Vickers hardness Hs of the shaft part surface is measured by the following method.

A Vickers hardness test in conformity with JIS Z 2244 (2009) is performed at an arbitrary three points on the surface of the hardened layer of the shaft part of the steel shaft component. The test force is set to 1.96 N. The arithmetic mean value of the obtained Vickers hardness values is defined as the Vickers hardness Hs (HV) of the shaft part surface.

If the Vickers hardness Hs of the shaft part surface is less than 620 HV, during use of the steel shaft component, cracks will easily occur from the shaft part surface due to stress applied to the steel shaft component. In such a case, sufficient fatigue strength will not be obtained in the steel shaft component. Therefore, the Vickers hardness Hs of the shaft part surface is 620 HV or more.

[Regarding Condition B]

In the steel shaft component, in addition, a Vickers hardness Hb at the R/2 position of the shaft part satisfies Formula (1):

$$Hs/2.3 \leq Hb \leq 350 \tag{1}$$

where, the numerical value of the Vickers hardness Hs of the shaft part surface is substituted for "Hs" in Formula (1).

The Vickers hardness Hb at the R/2 position of the shaft part corresponds to the Vickers hardness of the core part. If the Vickers hardness Hb of the core part is too low relative to the Vickers hardness Hs of the shaft part surface, a difference between the hardness of the core part and the hardness of the hardened layer will be excessively large. In such a case, even if the Vickers hardness Hs of the shaft part surface is sufficiently high, as mentioned above, cracks will easily occur in the core part at a portion in the vicinity of the hardened layer, and the fatigue strength of the steel shaft component will decrease. If the Vickers hardness Hb at the R/2 position is a value equivalent to Hs/2.3 or more, the difference between the hardness of the core part and the hardness of the hardened layer will be sufficiently small. Therefore, the occurrence of cracks in the core part at a portion in the vicinity of the hardened layer can be suppressed, and the fatigue strength of the steel shaft component can be increased.

Note that, the upper limit of the Vickers hardness Hb at the R/2 position is set to 350 HV. If the Vickers hardness Hb at the R/2 position is more than 350 HV, the machinability of the steel material decreases and the productivity markedly decreases. In addition, in a case where the Vickers hardness Hb at the R/2 position is more than 350 HV, high frequency quenching is excessively performed, and the steel material is excessively hardened. Consequently, tensile residual stress is liable to occur in the outer layer of the steel shaft component. In such a case, the fatigue strength of the steel shaft component decreases. Therefore, the upper limit of the Vickers hardness Hb at the R/2 position is 350 HV. A preferable lower limit of the Vickers hardness Hb at the R/2 position is Hs/2.23, more preferably is Hs/2.2, and further preferably is Hs/2.1. A preferable upper limit of the Vickers hardness Hb at the R/2 position is 345 HV, more preferably is 343 HV, and further preferably is 340 HV.

The Vickers hardness Hb at the R/2 position is measured by the following method. A Vickers hardness test in conformity with JIS Z 2244 (2009) is performed at an arbitrary three points at the R/2 position of the shaft part in a cross section perpendicular to the axial direction of the shaft part of the steel shaft component. The test force is set to 98 N. The arithmetic mean value of the obtained Vickers hardness values is defined as the Vickers hardness Hb (HV) at the R/2 position.

[Regarding Condition C]

In the steel shaft component, furthermore, a depth of the hardened layer Hr (mm) having a Vickers hardness of 620 HV or more satisfies Formula (2):

$$0.05 \leq Hr/R \leq 0.40 \tag{2}$$

where, the radius (mm) of the shaft part is substituted for R in Formula (2).

As mentioned above, in the present description, a region in which the Vickers hardness is 620 HV or more in the outer layer of the shaft part is defined as a hardened layer. The depth of the hardened layer Hr is measured by the following method.

In a cross section perpendicular to the axial direction of the shaft part, the Vickers hardness is measured at a pitch of 0.1 mm in the depth direction (radial direction) from the surface. The Vickers hardness is measured by performing a Vickers hardness test in conformity with JIS Z 2244 (2009). The test force is set to 1.96 N. The Vickers hardness distribution in the depth direction (radial direction) is plotted based on the obtained Vickers hardness values. In the obtained Vickers hardness distribution, the depth at which the Vickers hardness is 620 HV or more is defined as the depth of the hardened layer. In the cross section perpendicular to the axial direction of the shaft part, the Vickers hardness distribution in the aforementioned depth direction is determined from an arbitrary three places on the surface, and the arithmetic mean value of the depths of the hardened layer at the respective locations (three places) is defined as the depth of the hardened layer Hr (mm). The ratio (=Hr/R) of the obtained depth of the hardened layer Hr to the radius R (mm) of the shaft part is then determined.

If Hr/R is less than 0.05, the depth of the hardened layer at the shaft part of the steel shaft component is not sufficient. In such a case, the fatigue strength of the steel shaft component decreases. On the other hand, if Hr/R is more than 0.40, the hardened layer is formed excessively deeply. In such a case, tensile residual stress easily occurs at the surface of the steel shaft component, and as a result the fatigue strength of the steel shaft component decreases. If Hr/R satisfies Formula (2), on the premise that condition A, condition B, and condition D are satisfied, the balance between the core part hardness and the hardened layer hardness satisfies an appropriate relation, and consequently the fatigue strength of the steel shaft component increases. A preferable lower limit of Hr/R is 0.08, more preferably is 0.10, and further preferably is 0.15. A preferable upper limit of Hr/R is 0.38, more preferably is 0.35 and further preferably is 0.32.

[Regarding Condition D]

In addition, in the steel shaft component, in the hardened layer of a cross section perpendicular to the axial direction of the shaft part, the number of density of coarse V-containing precipitates is 10 particles/276 μm² or less. Here, the term "V-containing precipitates" means precipitates in which the content of V is 10% or more by mass %. Further, the term "coarse V-containing precipitates" means V-containing precipitates that have an equivalent circular diameter of more than 100 nm among the V-containing precipitates.

Even if a steel shaft component having the aforementioned chemical composition satisfies condition A to condition C, if the number of density of coarse V-containing precipitates in the hardened layer is more than 10 particles/276 μm², in the hardened layer there will be too many coarse V-containing precipitates which act as the starting points of cracks with respect to a load in the radial direction. In such a case, the fatigue strength of the steel shaft component decreases. On the other hand, when the number of density of coarse V-containing precipitates in the hardened layer is 10 particles/276 μm² or less, the number of coarse V-containing precipitates in the hardened layer is sufficiently small. Therefore, excellent fatigue strength is obtained in the steel shaft component. A preferable number of density of coarse V-containing precipitates in the hardened layer is 9 particles/276 μm² or less, and more preferably is 8 particles/276 μm² or less.

The number of density of coarse V-containing precipitates in the hardened layer is measured by the following method. The shaft part of the steel shaft component is cut in a direction perpendicular to the longitudinal direction (axial direction) of the steel shaft component. In the cross section of the shaft part, the hardened layer of the shaft part cross section is identified based on the method for measuring the depth of the hardened layer described above with regard to condition C. A sample is taken from an approximately ½ depth position from the surface of the identified hardened layer (that is, from a center position in the depth direction of the hardened layer of the shaft part cross section). Among the sample surfaces, a surface that corresponds to a cross section that is perpendicular to the longitudinal direction (axial direction) of the steel shaft component is adopted as the observation surface. A transmission electron microscope (TEM) is used to observe an arbitrary 10 visual fields (the area per visual field is 27.6 μm²) within the observation surface at a magnification of ×30,000. Note that, the thickness of the sample (thin film test piece for TEM) is approximately 50 nm.

The precipitates and inclusions in each visual field (referred to as a "observation surface") are subjected to quantitative analysis using energy dispersive X-ray spectroscopy (EDX) to quantitatively analyze the contents of the elements which the respective precipitates and inclusions contain and thereby identify V-containing precipitates. Specifically, among the precipitates and inclusions in the respective visual fields, those in which the content of V is 10% or more by mass % are identified as "V-containing precipitates".

The equivalent circular diameter of each V-containing precipitate identified is then determined. Here, the term "equivalent circular diameter" means the diameter (nm) when the area of the V-containing precipitate is converted into a circle. Among the V-containing precipitates in all of the visual fields, V-containing precipitates which have an equivalent circular diameter of more than 100 nm are defined as "coarse V-containing precipitates". The total number of coarse V-containing precipitates in all of the visual fields is determined. The number of density (particles/276 μm²) of the coarse V-containing precipitates is then determined based on the total number of coarse V-containing precipitates determined.

As described above, the steel shaft component of the present embodiment has the aforementioned chemical composition, and the microstructure at a core part of a shaft part is composed of ferrite and pearlite, and by satisfying all of conditions A to D, the occurrence of cracks in a core part region in the vicinity of the hardened layer that had not been known heretofore can also be suppressed and thus excellent fatigue strength is obtained.

[Method for Producing Steel Shaft Component]

One example of a method for producing the steel shaft component described above will now be described. Note that, the production method described hereunder is one example, and a method for producing the steel shaft component of the present embodiment is not limited to the following method. That is, as long as the steel shaft component of the present embodiment having the aforementioned structure can be produced, a method for producing the steel shaft component is not limited to the production method described hereunder. However, the production method described hereunder is a favorable production method for producing the steel shaft component of the present embodiment.

In the method for producing the steel shaft component of the present embodiment, first, a steel material for a steel shaft component having the aforementioned chemical composition is prepared. A steel material produced by a third party may be used as the steel material for the steel shaft component. Alternatively, the producer of the steel shaft component may produce the steel material for a steel shaft component.

The steel material for a steel shaft component is produced, for example, by the following method. Molten steel having the aforementioned chemical composition is produced by a well-known method. A starting material (cast piece or ingot) is produced using the molten steel. Specifically, a cast piece is produced by a continuous casting process using the molten steel. Alternatively, an ingot may be produced by an ingot-making process using the molten steel.

The produced starting material is subjected to hot working to produce steel material for a steel shaft component. The steel material for a steel shaft component is, for example, a steel bar. In the thermal engineering process, hot working is usually performed once or a plurality of times. In the case of performing hot working a plurality of times, the initial hot working is, for example, blooming or hot forging, and the next hot working is finish rolling using a continuous mill. In the continuous mill, horizontal stands that each have a pair of horizontal rolls, and vertical stands that each have a pair of vertical rolls are alternately arranged in a row. The steel material for a steel shaft component after the finish rolling is cooled until becoming room temperature. The steel material for a steel shaft component according to the present embodiment is produced by the above process. The heating temperature of the starting material for the hot working is, for example, 950 to 1350° C.

A steel shaft component is produced using the aforementioned steel material for a steel shaft component. The method for producing the steel shaft component includes a hot forging process, a machining process, an high frequency quenching process, a tempering process, and a cutting and machining engineering process. Hereunder, each of these processes is described.

[Hot Forging Process]

In the hot forging process, the steel material for a steel shaft component is subjected to hot forging to produce an intermediate product having the rough shape of the steel shaft component. Here, the term "rough shape" means a shape that is close to the final shape of the steel shaft component. The heating temperature in the hot forging process is, for example, 950 to 1350° C. Here, the term "heating temperature" means the heating temperature (° C.) in a reheating furnace or soaking pit prior to hot forging. If the heating temperature is within the range of 950 to 1350° C., on the premise that the other production conditions are satisfied, V-containing precipitates in the steel material for a steel shaft component sufficiently dissolve. Therefore, in the steel shaft component after the high frequency quenching process, the number of density of coarse V-containing precipitates in the hardened layer can be made 10 particles/276 µm² or less.

After finish rolling of hot forging, the steel material is cooled. At such time, the average cooling rate CR when the steel material temperature cools from 800 to 500° C. is 12° C./min or more. If the average cooling rate CR is less than 12° C./min, when the steel material temperature cools from 800 to 500° C., V-containing precipitates are formed due to interphase boundary precipitation and grow. In this case, the V-containing precipitates that formed during hot forging coarsen in the high frequency quenching process thereafter. Consequently, in some cases the number of density of coarse V-containing precipitates in the hardened layer will be more than 10 particles/276 µm². In addition, if the average cooling rate CR is less than 12° C./min, the hardness of the core part decreases, and the Vickers hardness Hb at the R/2 position becomes less than the lower limit of Formula (1). Therefore, the average cooling rate when the steel material temperature is between 800 and 500° C. is 12° C./min or more.

The average cooling rate when the steel material temperature is between 800 and 500° C. is determined by the following method. The steel material temperature after finish rolling reduction of the hot forging process is measured with a thermometer, and the time taken for the steel material temperature to cool from 800 to 500° C. is determined. The average cooling rate (° C./min) when the steel material temperature cools from 800 to 500° C. is determined based on the thus-determined time.

A preferable upper limit of the average cooling rate CR is 25° C./min, more preferably is 20° C./min, and further preferably is 15° C./min.

An intermediate product of the steel shaft component is produced by the hot forging process described above. Note that, in the present embodiment, with respect to the intermediate product, quenching in which the entire intermediate product is rapidly cooled after being heated using a heat treatment furnace, and tempering after quenching are not performed after the hot forging process. That is, a thermal refining treatment process that is after the hot forging process and before the high frequency quenching process is omitted.

[Machining Process]

The intermediate product after the hot forging process is subjected to machining such as cutting to finish the intermediate product into the final shape of the steel shaft component. It suffices to perform the machining by a well-known method.

[High Frequency Quenching Process]

The intermediate product after the machining process is subjected to an high frequency quenching treatment. Specifically, at least the surface of a portion which corresponds to the shaft part of the intermediate product is subjected to high frequency quenching. A high-frequency induction heating apparatus is used for the high frequency quenching. The intermediate product is heated while moving the high-frequency induction heating apparatus in the longitudinal direction (axial direction) of the intermediate product relatively with respect to the intermediate product. A water-cooling apparatus is arranged on the delivery side of the high-frequency induction heating apparatus. The portion of the intermediate product that passed through the high-frequency induction heating apparatus is rapidly cooled immediately by the water-cooling apparatus.

In the high frequency quenching, the output of the high-frequency induction heating apparatus is set to 20 to 60 kW, and the frequency is set to 150 to 300 kHz. Further, the movement speed of the high-frequency induction heating apparatus is set within the range of 4.0 to 8.0 mm/sec. If the movement speed of the high-frequency induction heating apparatus is less than 4.0 mm/sec, the shaft part of the intermediate product will be excessively heated. In such a case, the depth of the hardened layer Hr will be too deep, and the depth of the hardened layer Hr will not satisfy Formula (2). As a result, the fatigue strength of the steel shaft component will decrease. In addition, V-containing precipitates in the outer layer will excessively grow, and the number of density of coarse V-containing precipitates in the outer layer will be more than 10 particles/276 µm². On the other hand, if the movement speed of the high-frequency induction heating apparatus is more than 8.0 mm/sec, the depth of the hardened layer Hr will be too shallow. In such a case, cracks will occur in the core part region in the vicinity of the hardened layer of the steel shaft component, and the fatigue strength of the steel shaft component will decrease. When the movement speed of the high-frequency induction heating apparatus is within the range of 4.0 to 8.0 mm/sec, a hardened layer of an appropriate depth is formed, and the depth of the hardened layer Hr satisfies Formula (2). As a result, a steel shaft component having excellent fatigue strength is obtained.

[Tempering Process]

The intermediate product after the high frequency quenching process is subjected to tempering. The tempering temperature is within the range of 150 to 280° C. A preferable lower limit of the tempering temperature is 160° C., and preferably is 170° C. A preferable upper limit of the tempering temperature is 270° C. The tempering time is, for example, within the range of 15 to 150 minutes.

[Cutting and Machining Engineering Process]

A part of the surface of the intermediate product after the tempering process is cut to produce the steel shaft component that is the end product.

The steel shaft component of the present embodiment is produced by the above production process. Note that, a method for producing the steel shaft component is not limited to the method described above. The steel shaft component of the present embodiment may be produced by another method as long as a steel shaft component having the aforementioned chemical composition in which the microstructure at the R/2 position of the shaft part is composed of ferrite and pearlite and which satisfies all of conditions A to D can be produced.

EXAMPLES

The advantageous effects of one aspect of the steel shaft component of the present embodiment are described more specifically hereunder by way of examples. The conditions adopted in the examples are one example of conditions which are employed for confirming the workability and advantageous effects of the present invention. Accordingly, the steel shaft component of the present embodiment is not limited to this one example of the conditions.

Steel materials for a steel shaft component having the chemical compositions shown in Table 1 were prepared.

In the respective columns for each symbol of an element in Table 1, the content (mass %) of the corresponding element is shown. In Table 1, the symbol "-" indicates that the corresponding element could not be detected (that is, the content of the relevant element was at an impurity level). Specifically, for the content of V of Test Number 5, the symbol "-" means that the content was "o" % when the value was rounded off to two decimal places. For the content of Ti of Test Number 5, the symbol "-" means that the content was "0" % when the value was rounded off to three decimal places. The balance of the chemical composition of the steel material of each test number was Fe and impurities. The chemical composition of Test Number 5 corresponded to the chemical composition of 38 MnS 6 of the German Industrial Standards, which is widely used as a steel material for steel shaft components.

The steel material for a steel shaft component of each test number was subjected to hot forging, and a round bar material corresponding to an intermediate product was produced. In each test number, the heating temperature during the hot forging process was within the range of 1000 to 1200° C. Further, the average cooling rate CR (° C./min) when the steel material temperature cooled from 800 to 500° C. after finish rolling reduction was as shown in Table 2. The diameter of the produced round bar material was 60 mm.

Figure 4:
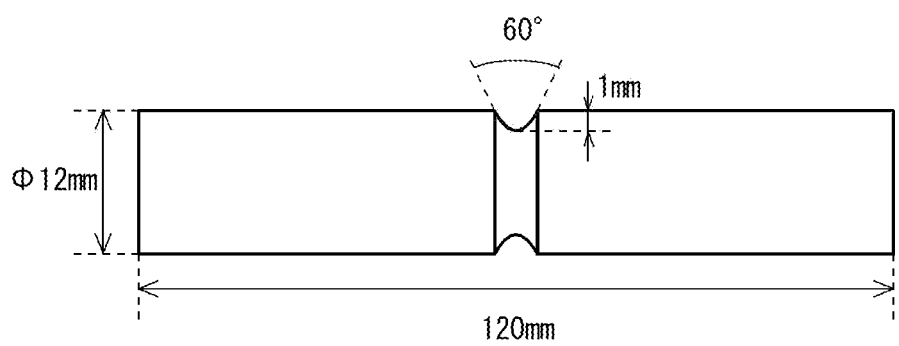
FIG. 4 is a side view of a steel for rotating bending fatigue testing in Examples.

A steel for rotating bending fatigue testing illustrated in FIG. 4 was prepared by machining from the round bar material. The steel material under test was a round bar shape, and the diameter was set to 12 mm, and the length was set to 120 mm. A notch was formed at the center position in the longitudinal direction of the steel material under test. The notch angle was set to 60°, and the notch depth was set to 1 mm. The diameter of the steel material under test at the notch bottom was set to 10 mm, and the radius of the notch bottom was set to 0.5 mm. The longitudinal direction (axial direction) of the steel material under test was parallel to the longitudinal direction (axial direction) of the round bar material.

The obtained steel material under test was subjected to high frequency quenching. A high-frequency induction heating apparatus was used for the high frequency quenching. The output of the high-frequency induction heating apparatus was set to 40 kW, the frequency was set to 220 kHz, and the movement speed (mm/sec) of the high-frequency induction heating apparatus was as shown in Table 2. A water-cooling apparatus was arranged on the delivery side of the high-frequency induction heating apparatus. The steel material under test was water-cooled by the water-cooling apparatus within one second after the steel material under test

TABLE 1

| Test No. | Chemical Composition (unit is mass %; balance is Fe and impurities) | | | | | | | | | |
|---|---|---|---|---|---|---|---|---|---|---|
| | C | Si | Mn | P | S | Cr | V | Al | N | Ti |
| 1 | 0.41 | 0.67 | 1.35 | 0.012 | 0.016 | 0.17 | 0.10 | 0.016 | 0.0111 | 0.014 |
| 2 | 0.49 | 0.56 | 1.13 | 0.005 | 0.020 | 0.13 | 0.11 | 0.040 | 0.0096 | 0.016 |
| 3 | 0.50 | 0.55 | 1.32 | 0.002 | 0.019 | 0.13 | 0.13 | 0.038 | 0.0090 | 0.018 |
| 4 | 0.59 | 0.40 | 1.23 | 0.005 | 0.066 | 0.14 | 0.10 | 0.034 | 0.0103 | — |
| 5 | 0.38 | 0.53 | 1.45 | 0.014 | 0.061 | 0.15 | — | 0.026 | 0.0131 | — |
| 6 | 0.38 | 0.54 | 1.50 | 0.015 | 0.056 | 0.15 | 0.09 | 0.014 | 0.0141 | — |
| 7 | 0.42 | 0.21 | 1.50 | 0.012 | 0.007 | 0.16 | — | 0.009 | 0.0062 | — |
| 8 | 0.49 | 0.57 | 1.00 | 0.014 | 0.064 | 0.17 | 0.13 | 0.034 | 0.0098 | 0.012 |
| 9 | 0.49 | 0.57 | 1.00 | 0.014 | 0.064 | 0.17 | 0.13 | 0.034 | 0.0098 | 0.012 |
| 10 | 0.49 | 0.56 | 1.13 | 0.005 | 0.020 | 0.13 | 0.11 | 0.040 | 0.0096 | 0.016 |
| 11 | 0.49 | 0.56 | 1.13 | 0.005 | 0.020 | 0.13 | 0.11 | 0.040 | 0.0096 | 0.016 | passed through the high-frequency induction heating apparatus. The movement speed of the high-frequency induction heating apparatus was adjusted to adjust the hardness and depth of the hardened layer Hr of the hardened layer. The steel material under test after high frequency quenching was subjected to tempering. The tempering temperature was as shown in Table 2. The tempering time was set to 90 minutes. Steel materials under test which simulated a steel shaft component were produced by the above production process.

test force was set to 1.96 N. The arithmetic mean value of the obtained Vickers hardness values was defined as the Vickers hardness Hs (HV). The obtained Vickers hardness Hs is shown in the "Hs" column in Table 2. Further, the value of Hs/2.3 is shown in the "Hs/2.3" column in Table 2.
[Vickers Hardness Hb Measurement Test]

The steel material under test after tempering was cut perpendicularly to the axial direction. A Vickers hardness test in conformity with JIS Z 2244 (2009) was performed at

TABLE 2

| Test No. | Hot Forging Process Average Cooling Rate CR (° C./min) | High Frequency Quenching Process Movement Speed (mm/sec) | Tempering Process Tempering Temperature (° C.) | Hs (HV) | Hb (HV) | Hs/2.3 | Formula (1) Lower Limit | Formula (1) Upper Limit | Hr/R | Fracture Starting Point | Micro- structure | Coarse V- containing Precipitates Number of Density (particles/276 μm²) | Fatigue Strength (MPa) | Fatigue Strength Ratio |
|---|---|---|---|---|---|---|---|---|---|---|---|---|---|---|
| 1 | 13 | 5.5 | 200 | 624 | 279 | 271 | T | T | 0.30 | Surface | F + P | 1 | 450 | 1.13 |
| 2 | 13 | 6.0 | 200 | 641 | 288 | 279 | T | T | 0.20 | Surface | F + P | 0 | 475 | 1.19 |
| 3 | 13 | 6.0 | 200 | 647 | 303 | 281 | T | T | 0.20 | Surface | F + P | 0 | 500 | 1.25 |
| 4 | 13 | 6.0 | 200 | 692 | 318 | 301 | T | T | 0.20 | Surface | F + P | 1 | 550 | 1.38 |
| 5 | 13 | 6.0 | 200 | 596 | 241 | 259 | F | T | 0.20 | Surface | F + P | 0 | 400 | 1.00 |
| 6 | 13 | 6.0 | 200 | 601 | 273 | 261 | T | T | 0.20 | Surface | F + P | 1 | 400 | 1.00 |
| 7 | 13 | 6.0 | 200 | 637 | 248 | 277 | F | T | 0.20 | Interior | F + P | 0 | 425 | 1.06 |
| 8 | 13 | 3.0 | 200 | 660 | 641 | 287 | T | F | 0.80 | Surface | M + B | 12 | 350 | 0.88 |
| 9 | 13 | 9.0 | 200 | 657 | 293 | 286 | T | T | 0.03 | Interior | F + P | 1 | 425 | 1.06 |
| 10 | 13 | 6.0 | 300 | 576 | 287 | 251 | T | T | 0.20 | Surface | F + P | 2 | 350 | 0.88 |
| 11 | 9 | 6.0 | 200 | 639 | 255 | 278 | F | T | 0.20 | Interior | F + P | 11 | 400 | 1.00 |

The following tests were performed on the steel materials under test produced by the above process.
[Microstructure Observation Test]

A sample for microstructure observation was taken from the R/2 position of the steel material under test after tempering. After mirror-polishing the surface (observation surface) of the obtained sample, the observation surface was subjected to etching using 3% nitric acid-alcohol (nital etching reagent). On the etched observation surface, an arbitrary five visual fields were observed using an optical microscope having a magnification of ×500, and photographic images were generated. The size of each visual field was set to 200 μm×200 μm. In each visual field, the contrast differed for each of the respective phases of bainite, ferrite, pearlite and the like. Accordingly, the respective phases were identified based on the contrast. The ferrite and pearlite in each visual field were identified, and the total area (μm²) of ferrite in all of the visual fields was determined, and the total area (μm²) of pearlite in all of the visual fields was determined. The proportion of the total of the total area of ferrite in all of the visual fields and the total area of pearlite in all of the visual fields with respect to the total area of all the visual fields was defined as the total area fraction (%) of ferrite and pearlite. If the total area fraction of ferrite and pearlite was 95.0% or more, it was determined that the microstructure was composed of ferrite and pearlite. The determined results are shown in the "Microstructure" column in Table 2. In Table 2, "F+P" indicates that the total area fraction of ferrite and pearlite in the microstructure was 95.0% or more, and the microstructure was a structure composed of ferrite and pearlite. Further, "M+B" indicates that the microstructure was a structure composed of martensite and bainite.
[Vickers Hardness Hs Measurement Test]

A Vickers hardness test in conformity with JIS Z 2244 (2009) was performed at an arbitrary three points on the surface of the steel material under test after tempering. The an arbitrary three points at the R/2 position in a cross section of the cut steel material under test. The test force was set to 98 N. The arithmetic mean value of the obtained Vickers hardness values was defined as the Vickers hardness Hb (HV) at the R/2 position. The obtained Vickers hardness Hb is shown in the "Hb" column in Table 2. If the Vickers hardness Hb was equal to or higher than the lower limit of Formula (1), "T (True)" is described in the "Formula (1) Lower Limit" column in Table 2. If the Vickers hardness Hb was less than the lower limit of Formula (1), "F (False)" is described in the "Formula (1) Lower Limit" column in Table 2. If the Vickers hardness Hb was equal to or lower than the upper limit of Formula (1), "T (True)" is described in the "Formula (1) Upper Limit" column in Table 2. If the Vickers hardness Hb was higher than the upper limit of Formula (1), "F (False)" is described in the "Formula (1) Upper Limit" column in Table 2.
[Depth of Hardened Layer Hr Measurement Test]

The steel material under test was cut perpendicularly to the axial direction. In a cross section of the cut steel material under test, the Vickers hardness was measured at a pitch of 0.1 mm in the depth direction (radial direction) from the surface. The Vickers hardness was measured by performing a Vickers hardness test in conformity with JIS Z 2244 (2009), in which the test force was set to 1.96 N. A Vickers hardness distribution in the depth direction (radial direction) was created based on the obtained Vickers hardness values. The depth at which the Vickers hardness became 620 HV or more in the Vickers hardness distribution was defined as the depth of the hardened layer (mm). In the cross section perpendicular to the axial direction of the steel material under test, the Vickers hardness distribution in the aforementioned depth direction was determined from an arbitrary three places on the surface, and the arithmetic mean value of the depths of the hardened layer at the respective locations (three places) was defined as the depth of the hardened layer Hr (mm). The ratio of the depth of the hardened layer Hr to the radius R (6 mm) of the steel material under test (=Hr/R) was determined. The obtained value for Hr/R is shown in the "Hr/R" column in Table 2.

[Test for Measuring Number of Density (Particles/276 μm$^2$) of Coarse V-Containing Precipitates]

The steel material under test was cut in a direction perpendicular to the axial direction. In the cut observation surface, the hardened layer was identified based on the result of the aforementioned depth of the hardened layer Hr measurement test. A sample was taken from a depth position which was a position at approximately ½ of the depth of the identified hardened layer. Among the surfaces of the sample, a surface corresponding to a cross section perpendicular to the axial direction of the steel material under test was adopted as the observation surface. An arbitrary 10 visual fields (the area per visual field was 27.6 μm$^2$) within the observation surface were observed at a magnification of ×30,000 using a TEM. The precipitates and inclusions in each visual field (referred to as a "observation surface") were subjected to quantitative analysis using EDX to quantitatively analyze the contents of the elements which the respective precipitates and inclusions contained, and among the precipitates and inclusions in the respective visual fields, the precipitates and inclusions in which the content of V was 10% or more by mass % were identified as "V-containing precipitates". The thickness of the sample (thin film test piece for TEM) was set to approximately 50 nm.

The equivalent circular diameter of each of the identified V-containing precipitates was determined. Among the V-containing precipitates in all the visual fields, the V-containing precipitates having an equivalent circular diameter of more than 100 nm were defined as "coarse V-containing precipitates", and the total number of the coarse V-containing precipitates in all the visual fields was determined. The number of density (particles/276 μm$^2$) of the coarse V-containing precipitates was determined based on the total number of coarse V-containing precipitates determined.

[Rotating Bending Fatigue Test]

A rotating bending fatigue test was carried out in conformity with JIS Z 2274 (1978) using the steel material under test of each test number. Specifically, the number of revolutions was set to 3600 rpm, and the maximum stress at which the steel material under test did not rupture after the stress load repetition count reached 10$^7$ cycles was adopted as the fatigue strength (MPa). The fatigue strength of the steel material under test of Test Number 5 was adopted as a reference, and the ratio of the fatigue strength of each test number with respect to the fatigue strength of Test Number 5 (hereinafter, referred to as a "fatigue strength ratio") was calculated by the following equation.

Fatigue strength ratio=fatigue strength of each test number/fatigue strength of Test Number 5

The fatigue strength ratio was obtained by rounding off the third decimal place of the obtained numerical value. If the fatigue strength ratio was 1.10 or more, the relevant steel material under test was determined to be excellent in fatigue strength.

Note that, with regard to a position (fatigue fracture starting point position) at which a crack occurred in a steel material under test that ruptured after the rotating bending fatigue test, the fracture surface was observed using an SEM to identify the relevant position. In the "Fracture Starting Point" column in Table 2, the term "Surface" means that the starting point of fatigue fracture was observed on the surface of the steel material under test. The term "Interior" means that, in the steel material under test, the starting point of fatigue fracture was observed further inward (that is, in the core part) than the hardened layer.

[Test Results]

Referring to Table 1 and Table 2, the chemical compositions of Test Numbers 1 to 4 were appropriate. In addition, the production conditions were appropriate. Therefore, the microstructure at the R/2 position was composed of ferrite and pearlite, and the surface Vickers hardness Hs was 620 HV or more. Further, the Vickers hardness Hb at the R/2 position satisfied Formula (1), and the ratio (Hr/R) of the depth of the hardened layer Hr to the radius R of the steel material under test satisfied Formula (2). Furthermore, the number of density of coarse V-containing precipitates was 10 particles/276 μm$^2$ or less. As a result, the fatigue strength ratio of each of Test Numbers 1 to 4 was 1.10 times or more the fatigue strength of Test Number 5 that served as a reference, and excellent fatigue strength was obtained.

On the other hand, in Test Number 6, the content of C and the content of V were too low. Therefore, in Test Number 6, the surface Vickers hardness Hs was less than 620 HV and the fatigue strength ratio was less than 1.10, and the fatigue strength was low.

In Test Number 7, V was not contained. Therefore, in Test Number 7, the Vickers hardness Hb at the R/2 position did not satisfy Formula (1). Consequently, the fatigue strength ratio was less than 1.10 and the fatigue strength was low. Note that, as a result of observing the steel material under test after the rotating bending fatigue test, it was found that cracks had occurred in the core part region in the vicinity of the hardened layer of the steel material under test.

In Test Number 8, the movement speed of the high-frequency induction heating apparatus was too slow. Therefore, the steel material under test was excessively hardened. Consequently, Hr/R was more than the upper limit of Formula (2). Further, the number of density of coarse V-containing precipitates was more than 10 particles/276 μm$^2$. As a result, the Vickers hardness Hb at the R/2 position was more than 350 HV. In addition, the fatigue strength ratio was less than 1.10, and the fatigue strength was low.

In Test Number 9, the movement speed of the high-frequency induction heating apparatus was too fast. Therefore, Hr/R was less than the lower limit of Formula (2). As a result, the fatigue strength ratio was less than 1.10 and the fatigue strength was low. Note that, as a result of observing the steel material under test after the rotating bending fatigue test, it was found that cracks had occurred in a core part region in the vicinity of the hardened layer of the steel material under test.

In Test Number 10, the tempering temperature was too high. Consequently, the Vickers hardness Hs of the surface of the steel material under test was lower than 620 HV. As a result, the fatigue strength ratio was less than 1.10, and the fatigue strength was low.

In Test Number 11, the average cooling rate CR when the steel material temperature cooled from 800 to 500° C. after hot forging was too slow. Therefore, the number of density of coarse V-containing precipitates was more than 10 particles/276 μm$^2$. In addition, the Vickers hardness Hb at the R/2 position was less than the lower limit of Formula (1). As a result, the fatigue strength ratio was less than 1.10, and the fatigue strength was low.

While an embodiment of the present invention has been described above, the aforementioned embodiment is merely an example for implementing the present invention. Accordingly, the present invention is not limited to the above embodiment, and the aforementioned embodiment can be appropriately modified and implemented within a range that does not deviate from the gist of the present invention.

The invention claimed is:

1. A steel shaft component, comprising:
one or a plurality of shaft parts, each of the shaft part having a circular shape in a cross section perpendicular to an axial direction, and having a hardened layer having a Vickers hardness of 620 HV or more in an outer layer;
wherein:
a chemical composition of the steel shaft component consists of, by mass %,
C: 0.40 to 0.60%,
Si: 0.05 to 1.00%,
Mn: 1.00 to 2.00%,
P: 0.030% or less,
S: 0.005 to 0.100%,
Cr: 0.10 to 0.50%,
V: 0.10 to 0.30%,
Al: 0.005 to 0.050%,
N: 0.0050 to 0.0200%,
Ti: 0 to 0.050%, and
the balance: Fe and impurities;
a Vickers hardness Hs of a surface of the shaft part is 620 HV or more;
in the cross section perpendicular to the axial direction of the shaft part, a Vickers hardness Hb at an R/2 position that corresponds to a center position of a radius R of the shaft part satisfies Formula (1);
a microstructure at the R/2 position is composed of ferrite and pearlite;
a depth Hr (mm) of the hardened layer having a Vickers hardness of 620 HV or more satisfies Formula (2); and
in the hardened layer of the cross section perpendicular to the axial direction of the shaft part, a number of density of V-containing precipitates which contain V and which have an equivalent circular diameter of more than 100 nm is 10 particles/276 µm$^2$ or less:

$$Hs/2.3 \leq Hb \leq 350 \tag{1}$$

$$0.05 \leq Hr/R \leq 0.40 \tag{2}$$

where, R in Formula (2) represents a radius (mm) of the shaft part.

2. The steel shaft component according to claim 1, wherein:
the chemical composition contains, by mass %,
Ti: 0.005 to 0.050%.

3. The steel shaft component according to claim 1, wherein:
the steel shaft component is a crankshaft or a camshaft.

4. The steel shaft component according to claim 2, wherein:
the steel shaft component is a crankshaft or a camshaft.

* * * * *